United States Patent
Syamala et al.

(10) Patent No.: US 11,256,619 B2
(45) Date of Patent: Feb. 22, 2022

(54) MEMORY MANAGEMENT FOR SERVERLESS DATABASES

(71) Applicant: Microsoft Technology Licensing, LLC, Redmond, WA (US)

(72) Inventors: Manoj Syamala, Redmond, WA (US); Arnd Christian König, Kirkland, WA (US); Vivek Narasayya, Redmond, WA (US); Junfeng Dong, Redmond, WA (US); Ajay Kalhan, Redmond, WA (US); Shize Xu, Redmond, WA (US); Changsong Li, Redmond, WA (US); Pankaj Arora, Redmond, WA (US); Jiaqi Liu, Redmond, WA (US); John M. Oslake, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 16/540,035

(22) Filed: Aug. 13, 2019

(65) Prior Publication Data
US 2020/0349067 A1    Nov. 5, 2020

Related U.S. Application Data

(60) Provisional application No. 62/843,538, filed on May 5, 2019.

(51) Int. Cl.
*G06F 12/02* (2006.01)
*G06F 12/126* (2016.01)

(52) U.S. Cl.
CPC ........ *G06F 12/0253* (2013.01); *G06F 12/126* (2013.01); *G06F 2212/1044* (2013.01); *G06F 2212/163* (2013.01)

(58) Field of Classification Search
CPC ............... G06F 12/0253; G06F 12/126; G06F 2212/1044; G06F 12/0246; G06F 12/121–123; G06F 12/0868; G06F 3/06
See application file for complete search history.

(56) References Cited

U.S. PATENT DOCUMENTS 10,049,051 B1 *   8/2018   Baldwin ............. H04L 67/2842
10,346,303 B1 *   7/2019   Abrahms ............. G06F 9/5038
(Continued)

FOREIGN PATENT DOCUMENTS

WO      2016069038 A1    5/2016

OTHER PUBLICATIONS

J. Xu, L. Cui, Z. Hao and C. Wang, "SA-PFRS: Semantics-Aware Page Frame Reclamation System in Virtualized Environments," 2017 IEEE 23rd International Conference on Parallel and Distributed Systems (ICPADS), Shenzhen, 2017, pp. 684-693, doi: 10.1109/ICPADS.2017.00093. (Year: 2017).*

(Continued)

*Primary Examiner* — Khoa D Doan

(57) ABSTRACT

A solution is disclosed for memory management of serverless databases that includes: based at least on detecting a trigger event, determining whether memory is to be reclaimed; based at least on determining that memory is to be reclaimed, determining an amount of memory to be reclaimed; identifying memory to be reclaimed; and reclaiming the identified memory. Disclosed solutions are flexible, enabling customization of the aggressiveness and manner of memory reclamation. This permits users to specify a tailored balance point between performance and cost, for arrangements that bill users based on resource usage (e.g., memory consumed by a serverless database). In some examples, users specify a ramp-down parameter that is used to determine how much memory can be evicted in a particular reclamation event, time intervals (or another cri- (Continued)

teria) for triggering a reclamation event, and a definition for whether a cache is active.

20 Claims, 7 Drawing Sheets

(56) References Cited

U.S. PATENT DOCUMENTS

| | | | | |
|---|---|---|---|---|
| 10,379,755 | B2* | 8/2019 | Lo | G06F 12/0246 |
| 10,725,668 | B1* | 7/2020 | Tang | G06F 3/0608 |
| 2006/0064549 | A1 | 3/2006 | Wintergerst | |
| 2007/0150691 | A1* | 6/2007 | Illendula | G06F 12/0246 |
| | | | | 711/170 |
| 2012/0246411 | A1 | 9/2012 | Birka et al. | |
| 2013/0054929 | A1* | 2/2013 | Baik | G06F 12/126 |
| | | | | 711/170 |

OTHER PUBLICATIONS

Jabob, Ng, Wang, Memory Systems Cache, DRAM, Disk, 2008 (Year: 2008).*

J. Yue, Y. Zhu, Z. Cai and L. Lin, "Energy Efficient Buffer Cache Replacement for Data Servers," 2011 IEEE Sixth International Conference on Networking, Architecture, and Storage, 2011, pp. 329-338. (Year: 2011).*

"International Search Report and Written Opinion Issued in PCT Application No. PCT/US20/023462", dated May 29, 2020, 13 Pages.

"Amazon Aurora Pricing", Retrieved From: http://web.archive.org/web/20180920134207/https://aws.amazon.com/rds/aurora/pricing/, Sep. 20, 2018, 5 Pages.

"Amazon Aurora Serverless", Retrieved From: http://web.archive.org/web/20171129181726/https://aws.amazon.com/rds/aurora/serverless/, Nov. 29, 2017, 8 Pages.

"B-series Burstable Virtual Machine Sizes", Retrieved From: http://web.archive.org/web/20190421162911/https://docs.microsoft.com/en-us/azure/virtual-machines/windows/b-series-burstable, Sep. 7, 2017, 4 Pages.

"Choosing the DB Instance Class", Retrieved From: https://docs.aws.amazon.com/AmazonRDS/latest/UserGuide/Concepts.DBInstanceClass.html, Retrieved From: Jul. 12, 2019, 23 Pages.

"CPU Credits and Baseline Performance", Retrieved From: http://web.archive.org/web/20171205225830/https://docs.aws.amazon.com/AWSEC2/latest/UserGuide/t2-credits-baseline-concepts.html, Dec. 5, 2017, 3 Pages.

"Azure SQL Database serverless (preview)", Published Jul. 4, 2019, 16 pages.

Gray, et al., "The 5 minute rule for trading memory for disc accesses and the 10 byte rule for trading memory for CPU time", Retrieved from https://dl.acm.org/citation.cfm?id=38755, 1987, 4 pages.

Gray, et al., "The Five-Minute Rule Ten Years Later, and Other Computer Storage Rules of Thumb", Retrieved from http://jimgray.azurewebsites.net/5_min_rule_sigmod.pdf, 2000, 6 pages.

Graefe, G., "The Five-Minute Rule 20 Years Later", Communications of the ACM, Jul. 2009, vol. 52 No. 7, pp. 48-59.

Appuswamy, et al., "The Five minute-rule Thirty Years Later and its Impact on the Storage Hierarchy", Retrieved at: http://www.adms-conf.org/2017/camera-ready/5minute-rule.pdf, 2017, 8 pages.

O'Neil, et al., "The LRU-K page replacement algorithm for database disk buffering", ACM Sigmod Record, 22(2), 1993, pp. 297-306.

Oks, Slava, "SQLOS Caching", Retrieved at: https://blogs.msdn.microsoft.com/slavao/2005/03/18/sqlos-caching/, Mar. 18, 2005, 8 pages.

* cited by examiner

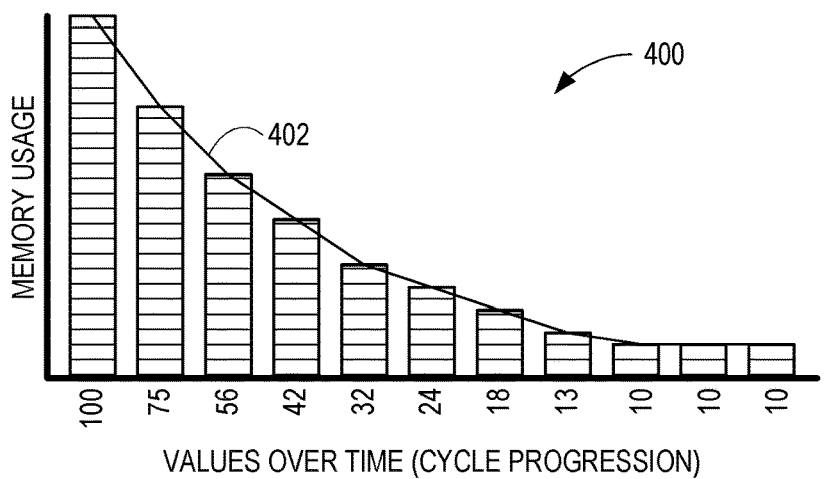
FIG. 4
FIG. 5
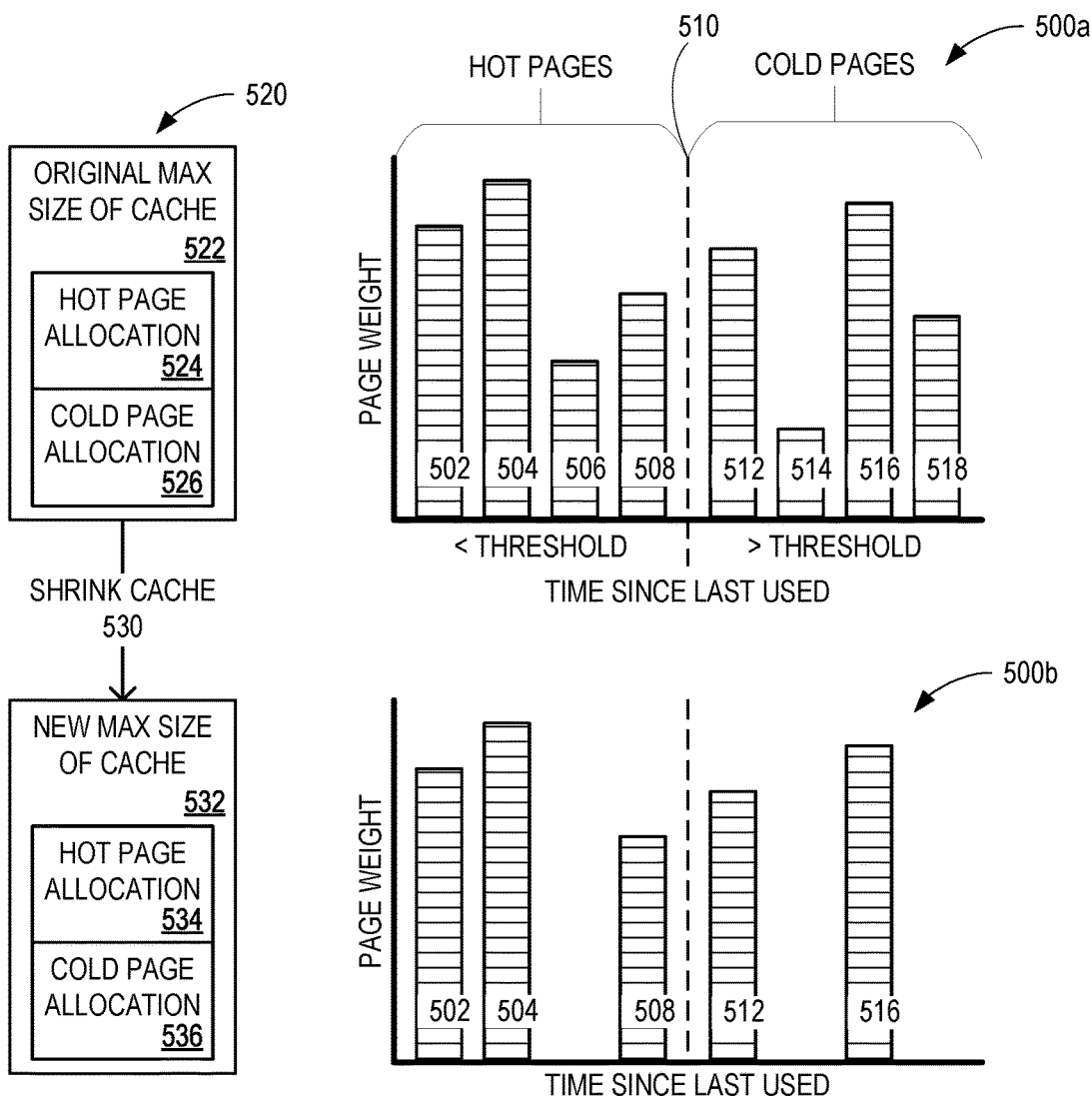

MEMORY MANAGEMENT FOR SERVERLESS DATABASES

CROSS-REFERENCE TO RELATED APPLICATION

This application claims the benefit of U.S. Provisional Patent Application No. 62/843,538, filed May 5, 2019, entitled "Memory Management For Serverless Databases", the entirety of which is hereby incorporated by reference herein.

BACKGROUND

Cloud-based database service offerings include both provisioning a fixed level of resources and also providing demand-based options, in which users pay an amount that is largely based on the actual resources used (CPU, memory, I/O loading). This latter option may be referred to as a serverless database model (or service), and provides potential advantages for users with intermittent, bursty, and/or unpredictable workloads. Some examples are retail websites with cool/hot sales seasons, independent service vendors who provide software as a service (SaaS) applications, or development and testing environments with burstable requests with heavy workloads, etc. In such examples, it may be challenging for users to configure the optimal capacity at the proper time, and result in higher costs when users pay for surplus capacity.

Generally, database servers cache data pages, query execution plans, column store entries, locks, security tokens, and other data items to improve performance. In some scenarios, cache memory usage persists, even in the absence of an active user workload. This may have a negative cost impact for the serverless model.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a solution for memory management of serverless databases that includes: detecting a trigger event for reclaiming memory from a serverless database instance; based at least on detecting the trigger event, determining whether memory is to be reclaimed; based at least on determining that memory is to be reclaimed, determining an amount of memory to be reclaimed; identifying memory to be reclaimed; and reclaiming the identified memory.

BRIEF DESCRIPTION OF THE DRAWINGS

The disclosed examples are described in detail below with reference to the accompanying drawing figures listed below:

FIG. 4 shows an exemplary ramp-down profile for memory usage during the process of FIG. 3;

FIG. 5 shows a graphical depiction of an implementation of a reclamation policy used during the process of FIG. 3;

Corresponding reference characters indicate corresponding parts throughout the drawings.

DETAILED DESCRIPTION

Figure 1:
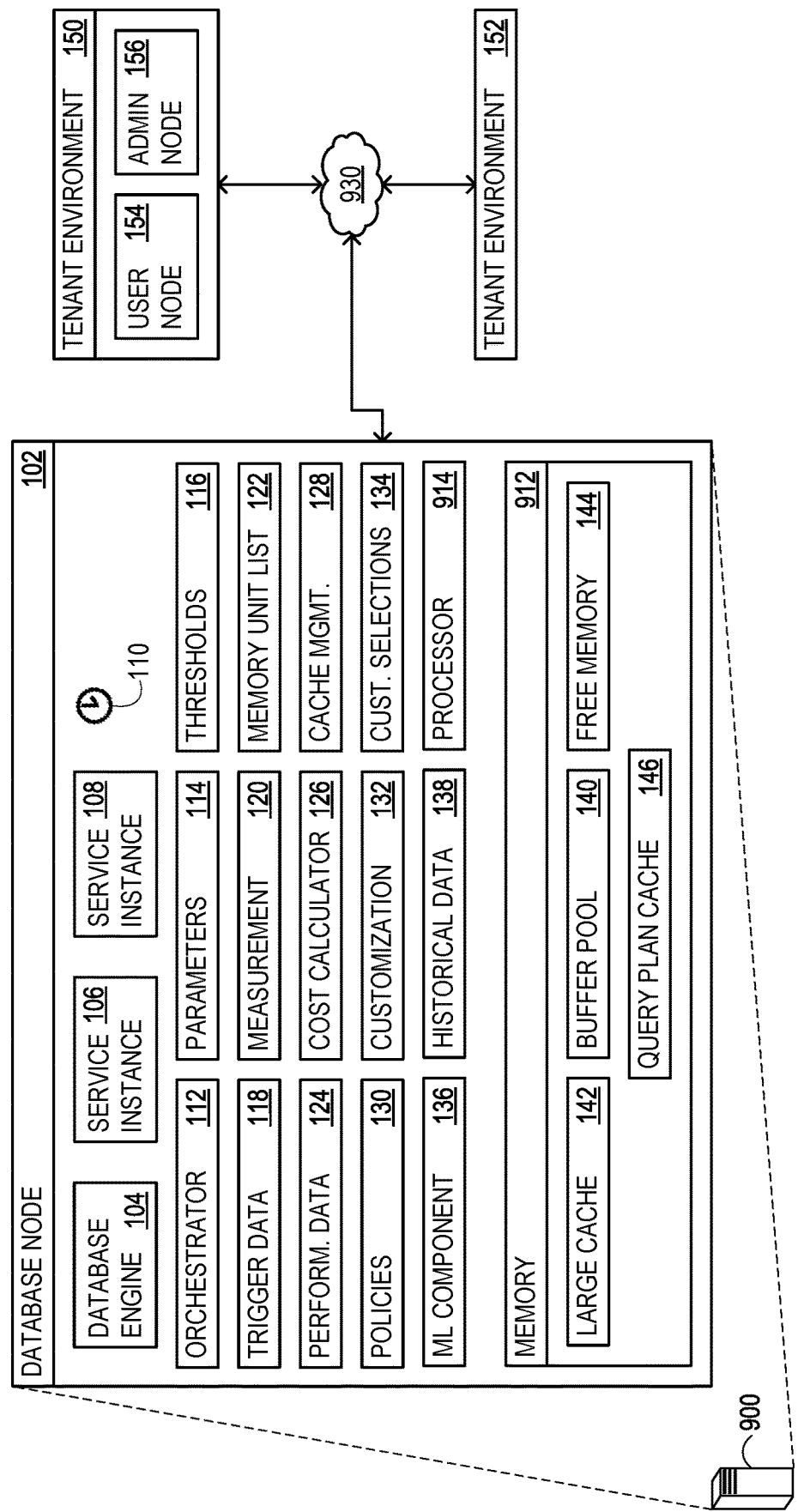
FIG. 1 illustrates an environment that advantageously employs memory management for serverless databases.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Some database instances tend to proactively cache data pages in a buffer pool, query execution plans, column store entries and segments, session information, security tokens, locks, and other data items, to improve performance. Traditionally, some relational databases have been designed to cache as much data as possible, since caching more objects generally helps (rather than hurting) performance. Such implementations typically evict cached objects only when there is memory pressure, such as when memory limits are reached or memory usage exceeds a threshold. Eviction for buffer pool pages is based on the LRU-2 algorithm, in some examples. However, in the context of serverless databases where using more memory also incurs a higher monetary cost to the customer, the above approach of caching as many objects as possible may have a negative cost impact. This negative cost impact may be exacerbated when cache memory is not reduced as the user workload decreases.

Aspects of the disclosure provide solutions for memory management of serverless databases that include: based at least on detecting a trigger event, determining whether memory is to be reclaimed; based at least on determining that memory is to be reclaimed, determining an amount of memory to be reclaimed; identifying memory to be reclaimed; and reclaiming the identified memory. Disclosed solutions are flexible, enabling customization of the aggressiveness and manner of memory reclamation. This permits users to specify a tailored balance point between performance and cost, for arrangements that bill users based on resource usage (e.g., memory consumed by a serverless database). In some examples, users can specify a ramp-down parameter that is used to determine how much memory can be evicted in a particular reclamation event, time intervals (or another criteria) for triggering a reclamation event, and a definition for whether a cache is active. In some examples, users can specify an active cache utilization threshold for triggering a reclamation event, such as a fraction of the aggregate size of active cache entries relative to aggregate size of all cache entries.

Aspects of the disclosure operate in an unconventional way to improve memory management for serverless databases by shrinking cache memory while mitigating performance impact. In some examples, the service automatically and transparently scales resources to satisfy workload demand and charges users predominantly for the amount of computing resources actually consumed. In some examples, a user of a serverless database does not have a persistent connection to a server instance. During a configurable or fixed time interval (e.g., 15 minutes), some examples evaluate overall cache activeness ratio (e.g., the fraction of pages that had been accessed during a prior interval, a.k.a., the "active cache utilization"). With some implementations, the overhead for computing the cache activeness ratio (e.g., active cache utilization) and required statistics are minimal. If the active cache utilization is below a predefined threshold (e.g., 30%, or a configurable threshold, in some examples), a target memory size is set for the caches, for example for the entire cache and/or different individual caches. The target memory size is either pre-calculated or, in some examples is configurable. Some examples include a machine learning (ML) based determination of the target memory size as another policy configuration. In some examples, the target memory size is either pre-calculated, or is configurable by user, or is determined by an ML algorithm that evaluates historical usage patterns to optimize price and performance trade-offs.

The external and internal caches, including buffer pool, large caches, plan/object caches, and others, are then shrunk in accordance with the target memory size. For example, at a configurable or fixed time interval (e.g., one hour, or another interval), user activity is examined for a prior time period (e.g., the immediately prior 30 minutes or another configurable time duration). If there had been no user activity, all caches are flushed, and the memory is shrunk to a predefined minimum memory limit, which is configurable in some examples. In some examples, there are two primary classes of triggers for cache reclamation: (1) If database activity is low for a configurable time period, then cache reclamation occurs in steps over time (typically gradually) to a predefined minimum cache size. (2) If database activity is rapidly goes to nothing (e.g., CPU usage caused by user operations is zero) for a configurable time period, then all caches are flushed and shrunk to a predefined minimum limit. In some examples, the configurable parameters, values, and definitions described herein are tuned based on historical performance data, for example with an ML component or some other process.

In some examples, the parameters of the serverless memory management policy are configurable per instance of a database, such that serverless databases instances can have different policy parameter values. The implementation and policy are both parameterized and are adaptable for different tenants' policies, in some examples. The configuration of these parameter values can be performed internally by the service provider and configuration permissions can also be extended to the user (e.g., customer owner) of the serverless database instance. This configuration flexibility applies to any of the configurable parameters described herein. Aspects of the disclosure generalize to multiple types of caches, regardless of cache eviction policy and statistics stored. In some examples, the cache type (e.g., buffer pool, plan cache, column store cache, and other cache types) included within the scope of the memory reclamation policy defaults to all cache types. However, in some examples, the memory management policy allows inclusions or exclusions of specific cache types.

Aspects of the disclosure may be generalized to other types of caches in other database engines beyond SQL or cloud services, such as, for example, database engines running in an on-premises deployment. That is, SQL instances are available for users to run both in on-premises environments and cloud service environments. The flexible resource allocation enables service providers to offer more capacity to customers and increases availability of the services. Additionally, the memory reclamation policy for serverless databases also enables billing users more closely aligned with the users' perception of actual usage. This is because, if cache memory wasn't reclaimed based on measures of low active cache utilization, cache memory usage could remain high over time even when database usage by the customer workload is low or non-existent. This would mean that user's bills for memory would not align with variations over time in database usage and the pricing model could potentially become unfavorable. Billing accurately for actual memory usage incents customers to balance price-performance trade-offs when configuring memory reclamation parameters.

Aspects of the disclosure include automatic cache reclamation so that an individual customer can configure it easily to strike the appropriate balance between their database's performance and cost requirements. In some examples, settings of the configuration parameters are initially targeted for buffer pool memory, which is the predominant consumer of memory in many Azure SQL databases. However, the serverless memory management policy can target all SQL caches, not just the buffer pool. This includes, but not limited to, the query plan cache and column storage cache which may also consume a significant fraction of total cache memory. Memory usage thus becomes more efficient so that users pay only for actively-used memory, rather than for memory that had been reserved but not actually used. In some examples, the trimming parameters are tailored by the user to adjust to the user's preference for aggressiveness, such as frequency, trigger sensitivity for starting a reclamation cycle, the maximum allowable amount of memory to trim per cycle, and the definition of "actively-used" memory such as the time elapsed since latest cache hit in order to be considered active.

In some examples, there are multiple deployment models available for users to select. For example, a user is able choose between creating a single database deployment model and pool deployment model in which a pool of multiple database instances shares memory resources from the same underlying database instance. In some scenarios, the pool model generally appeals to users employing multiple databases for a common application.

FIG. 1 illustrates an environment 100 that advantageously employs memory management for serverless databases. A database node 120 provides serverless databases as a cloud service to tenant environments 150, 152 and others, across a network 930. Database node 120 includes at least one processor 914 and a memory 912. In some examples, the various components 104-138 shown for database node 120 reside within memory 912 and form various portions of data 912a and instructions 912b of FIG. 9. Processor 914, memory 912, and network 930 are described in further detail in relation to FIG. 9.

Database node 120 has a database engine 104, which includes data and computer-executable instructions that, upon execution, provide for serverless database instances 106 and 108, although a different number of instances may exist. In operation, a user node 154 within tenant environment 150 interfaces with serverless database instance 106 to retrieve data for consumption and/or provide data for storage. A timer 110 provides timer events as inputs for trigger events and permits measuring time elapsed since a cache item has been accessed. Some cache areas of memory 912 are illustrated: a buffer pool 140, a large cache 142, a query plan cache 146, and free memory 144. Although a single manifestation of each of buffer pool 140, a large cache 142, query plan cache 146, and free memory 144, it should be understood that SQL cache memory resides within each database instance (aka SQL instance). That is, each of serverless database instances 106 and 108 has its own buffer pool 140, a large cache 142, query plan cache 146, and other caches. Thus, in some examples, a given hardware node with a cluster of database instances contains multiple buffer pools, query plan caches, etc., each belonging to a different database instance. Although it should be understood that other cache types are used in some examples. In some examples, buffer pool 140 uses 8 KB pages, although other sizes (e.g., 4 KB) may be used, and other cached objects may be larger or smaller.

An orchestrator 112 performs memory management for serverless database instances 106 and 108, for example by managing memory reclamation processes described herein. For managing the caches (buffer pool 140, large cache 142, query plan cache 146, and free memory 144) in memory 912, orchestrator 112 uses parameters 114, thresholds 116 (e.g., resource utilization thresholds), and trigger data 118. In some examples, a trigger condition to reclaim cache memory, is based on any or any combination of the following inputs: timer 110, measurements 120, performance data 124, historical data 138, and thresholds 116. Some examples include a "cool down period" as a time that must elapse between reclamation episodes. As with all other reclamation policy parameters, the cool down period is configurable. This "cool down period" can be classified as either a threshold 116 or fall under the umbrella of trigger data 110, or stand on its own. In some examples, trigger data 118 includes time information (such as timestamps) from timer 110. In operation, user node 154 and/or an administrator node 156 within tenant environment 150 interfaces with orchestrator 112 via a customization component 132 to customize parameters 114, thresholds 116, and trigger data 118. For example, database node 120 receives user selections 134 via customization component 132 to implement user preferences. Orchestrator 112 uses trigger data 118 and/or thresholds 116 to determine whether to begin a memory reclamation cycle, and manages the memory reclamation cycle according to data within parameters 114 and thresholds 116.

Measurements 120 holds data resulting from orchestrator 112 measuring a set of performance parameters 122 for determining whether memory is to be reclaimed. A memory unit list 124 identifies memory units that are in use (e.g., memory units within buffer pool 140, large cache 142, query plan cache 146, and free memory 144, etc.), at least some of which are potential reclamation targets, as indicated in further detail in the description of FIG. 5. A cost calculator 126 determines the cost to rehydrate a cache item, which is also described in further detail in relation to FIG. 5. A cache management component 128 manages the caches (buffer pool 140, large cache 142, query plan cache 146, and free memory 144) in memory 912 for orchestrator 112. Policies 130 are used by cache management component 128 or orchestrator 112 for reclaiming identified memory (e.g., memory identified to be reclaimed during a reclamation cycle). That is, orchestrator 112 reclaims identified memory according to a reclamation policy identified within policies 130.

An ML component 136 permits further improvement of the memory reclamation process, in some examples, by collecting historical data 138. Historical data 138 provides training data, when feedback is provided on performance with certain parameters 14, thresholds 116, and trigger data 118, so that ML component 136 can optionally tune parameters 14 (e.g., ramp-down parameters), thresholds 116, and trigger data 118. ML tuning is set by user permission, in some examples. Ramp-down parameters are described in further detail in relation to FIG. 4.

For some examples of environment 100, database node 102 includes processor 914 and memory 912 that stores instructions 912b (see FIG. 9) that are operative when executed by processor 914 to: detect a trigger event for reclaiming memory from a serverless database instance (e.g., memory within caches 140-144); based at least on detecting the trigger event, determine whether memory is to be reclaimed; based at least on determining that memory is to be reclaimed; determine an amount of memory to be reclaimed; identify memory to be reclaimed; and reclaim the identified memory. See FIG. 5 for examples of identified memory 506, 514 and 518 that are reclaimed.

In some examples, the trigger event comprises at least one event selected from the list consisting of a timer event (from timer 110) and a memory usage parameter exceeding a threshold (identified within thresholds 116). In some examples, orchestrator 112 receives a selection (from tenant environment 150) defining at least a portion of a set of performance parameters (in parameters 114). In some examples, determining whether memory is to be reclaimed comprises measuring the set of performance parameters, with the measurement data stored in measurements 120. In some examples, determining an amount of memory to be reclaimed comprises calculating the amount of memory to be reclaimed using a ramp-down parameter. In some examples, orchestrator 112 receives a selection defining the ramp-down parameter, which is stored in parameters 114. In some examples, orchestrator 112 uses ML component 136 to tune the ramp-down parameter based at least on historical data 138. In some examples, identifying memory to be reclaimed comprises identifying a memory eviction priority. In some examples, the memory eviction priority is based at least on a cost to rehydrate a cache entry, as calculated by cost calculator 126. In some examples, orchestrator 112 receives a selection defining a memory reclamation policy, which is stored in policies 130. In some examples, reclaiming the identified memory comprises reclaiming the identified memory according to the reclamation policy. In some examples, orchestrator 112 scales CPU resources (e.g., usage of processor 914) independently of scaling cache memory 140-144 resources.

Figure 2:
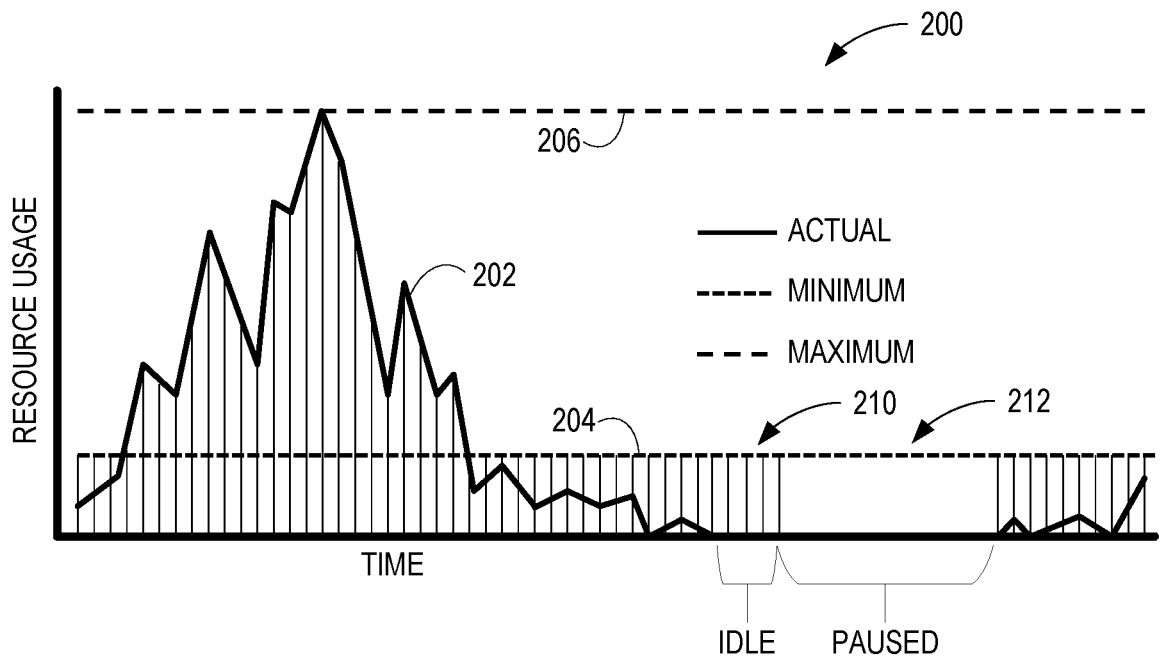
FIG. 2 illustrates an exemplary timeline of resource utilization in the environment of FIG. 1.

FIG. 2 illustrates an exemplary timeline 200 of resource utilization for environment 100. Timeline 200 illustrates CPU utilization (e.g., processor 914), although utilization of memory 912 is somewhat similar. In the absence of memory reclamation, however, memory utilization is generally non-decreasing. In some examples, CPU resources scale independently of cache memory resources (e.g., buffer pool 140, large cache 142, free memory 144, and others). A resource utilization curve 202 represents actual demand on percentage of CPU or memory, which increases and decreases according to workload variations over time. A minimum 204 represents a minimum reservation, and a maximum 206 is limited by the host. That is, computational resources for serverless database instances (e.g., vCore limits, memory limits, I/O limits, etc) are automatically scaled between minimum 204 and maximum 206. In some examples, minimum memory is configurable which provides users with some control over how much cache memory can ever be reclaimed. In some scenarios, minimum memory is increased in order to reduce the performance impact from memory reclamation. An idle period 210 indicates a period in which the workload has diminished to effectively nothing, but the service is still active. A pause period 212 occurs when resources are released.

A serverless database can be used for bursty and intermittent workloads with low average usage. When there is no workload, the serverless database (e.g., serverless database instance 106) enters idle period 210 period during which customers (users) may typically pay only for minimum resources. In some examples, after a pre-defined inactive (idle time) time, the database is paused for pause period 212, during which billing may be reduced further (e.g., to costs for storage and minimal overhead). A serverless database is allowed to burst up to a usage of maximum 206 (e.g., a defined number of vCores for CPU and maximum memory, such as 12 GB). Although the service provider is able to allocate such resources dynamically, as needed, static allocation of the maximums would both reduce the total number of users for a given computing architecture, as well as raise user's costs. Aspects of the disclosure avoid overcommitting resources for serverless database relative to the maximum resources (e.g., maximum 206 for CPU and memory), while allowing resources needed for bursty workloads, to provide favorable performance, all while lowering costs.

Figure 3:
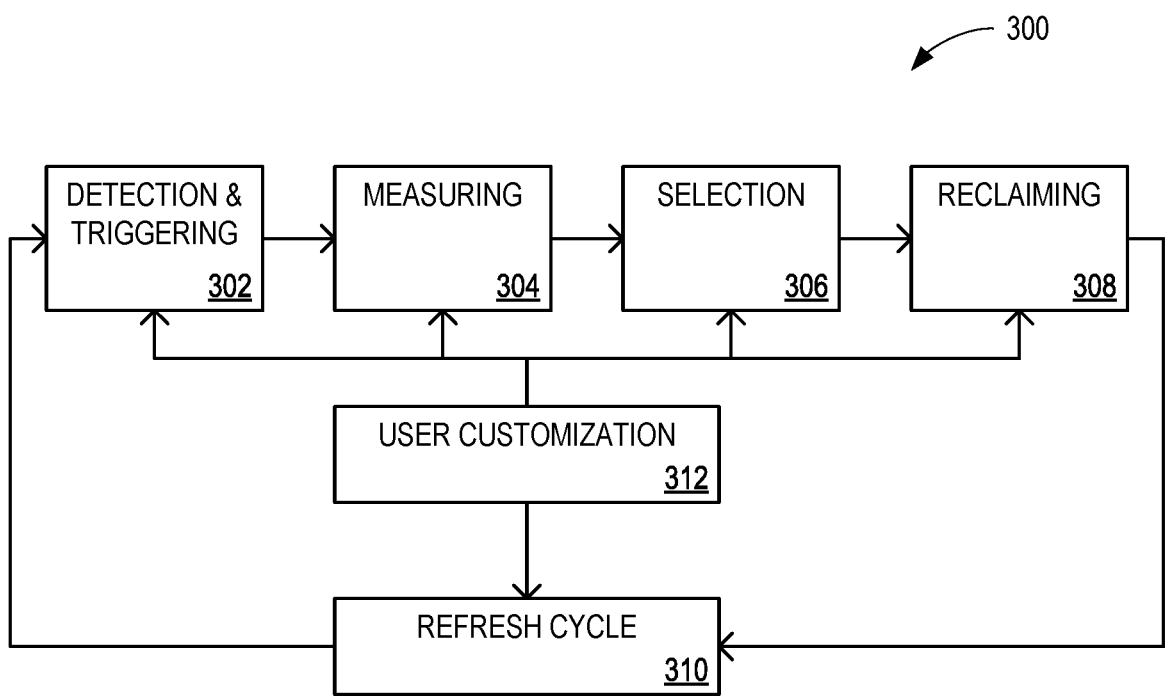
FIG. 3 shows exemplary phases of a memory management process for serverless databases used in conjunction with the environment of FIG. 1.

FIG. 3 shows exemplary phases 302-308 of a memory management process 300 for serverless databases used in conjunction with environment 100. A detection and triggering phase 302 includes detecting a triggering event for reclaiming memory, using orchestrator 112 (of FIG. 1) and one or more of timer 110, trigger data 118, and thresholds 116. A measuring phase 304 includes determining whether memory is to be reclaimed, using orchestrator 112 and one or more of parameters 114, thresholds 116, measurements 120, performance data 122, and memory unit list 124. A selection phase 306 includes determining an amount of memory to be reclaimed, using orchestrator 112 and one or more of parameters 114, memory unit list 124, and cost calculator 126. Selection phase 306 also includes identifying memory to be reclaimed, using orchestrator 112 and one or more of parameters 114, memory unit list 124, and cost calculator 126, memory unit list 124, and cache management component 128. A reclaiming phase 38 includes reclaiming the identified memory (memory identified in selection phase 306), using orchestrator 112 and one or more of cache management component 128 and policies 130.

Phases 302-308 form a reclamation cycle, which is repeated according to a refresh cycle control 310. A user customization operation 312 permits users (e.g., customers) to tailor individual portions of memory management process 300, based on the flexibility offered by various examples, such as by submitting user selections 134 via customization component 132. In some examples, with user permission, an ML tuning operation 314 adjusts some aspects of memory management process 300, for example parameters 114, thresholds 116, and trigger data 118. ML tuning operation 314 uses ML component 136 and historical data 138 to refine operations, for example by tuning one or more ramp-down parameters. Examples of customization and tuning include: timing for the next triggering check in detection and triggering phase 302, and which performance inputs are measured in measuring phase 304. Additional examples include ramp-down parameters and memory reclamation prioritization criteria used in selection phase 306, and policies used in reclaiming phase 38.

In some examples, on a fixed time interval (e.g., 15 minutes) a cache activeness ratio (e.g., the fraction of pages that were accessed during a prior interval or some other time period) is evaluated. If the activeness ratio is below a predefined threshold (e.g., 30%) as set in thresholds 116, the target memory size for the caches is set to a pre-calculated size to shrink external and internal caches, including buffer pool 120, large cache 142, free memory 144, plan/object caches, and others. In some examples, various performance inputs are measured to determine whether memory should be reclaimed.

FIG. 4 shows a plot 400 with an exemplary ramp-down profile 402 of memory usage during memory management process 300. In the illustrated example, the initial memory usage is M units. The overall approach for automatic cache reclamation modifies estimate a new memory target, $M_T$ (where $M_T<M$) to determine an amount of memory to be reclaimed. In some examples, the database server's (e.g., database engine 104 of FIG. 1) standard memory reclamation mechanism is leveraged with the new memory target $M_T$. By using the standard memory reclamation mechanism, some examples leverage and modify database-specific cache eviction policies that have been developed and fine-tuned based on real-world experience.

In some examples, a buffer pool page or optionally other cache entries from any other type of SQL cache is defined to be idle if it has not been accessed in k minutes. At regular intervals of t minutes (with the constraint that t≤k in some examples), a background thread in the database server attempts to reclaim memory. In some examples, the default value of k is 30 minutes, and t is 15 minutes, although these are configurable as described above, in some examples.

If a small value of k is set (e.g., 5 minutes) by the user, this indicates that the user desires to reclaim pages soon after the page meets the criteria for being idle. Otherwise the user's purpose for setting k to a small value might not be fulfilled. In some examples, memory reclamation is triggered based on low usage by the database workload, as measured by specific usage metrics. If the active cache utilization relative to total memory usage is less than a configurable threshold (e.g., 30%), or if CPU utilization relative to the maximum number of vCores configured is less than a configurable threshold (e.g., 30%) over a configurable period of time (e.g., 5 minutes), memory is reclaimed. A serverless memory management policy can also be adjusted to reclaim memory based upon the active cache utilization being low, independently of CPU utilization. Such a determination is made during measuring phase 304, in some examples. This policy flexibility allows workloads with high CPU utilization and low memory utilization to reduce memory costs and the user's costs. This policy flexibility also allows workloads with low CPU utilization to grow and maintain cache memory when memory demand is high. In both cases, this policy allows automatic scaling of CPU resources and cache memory resources to occur independently, based on differences in the actual demand for each type of resource from the database workload. Independent automatic scaling can occur both upward and downward. In the case of memory, automatic downward scaling is the memory reclamation described herein. In some examples, the scaling memory upwardly is not constrained by a timer or usage based thresholds.

At the time that a memory reclamation cycle is triggered, $M_{Idle}$, represents the total amount of idle memory. The calculations below provide an exemplary determination of an amount of memory to be reclaimed. The total memory is never allowed to go below Mm, the minimum memory set for serverless databases (e.g., serverless database instances 106 and 108). The amount of memory reclaimed in a single cycle is limited to R1 times the current memory usage. In some examples R1 is 25%; in some examples, R1 is 50%; in some examples, R1 is another value. The amount of memory reclaimed in a single cycle is also limited to R2 times the idle memory ($M_{Idle}$). In some examples, R2 is 75%; in some examples, R2 is another value. Ramp-down parameters R1 and R2 (which are stored in parameters 114 of FIG. 1 and may be both customized by the user and tuned by ML component 136) control how quickly cache memory is reclaimed. This sets a cost-performance trade-off for the workload.

With this example, the new memory target is computed as:

$$M_T = M - \min(R1M, R2M_{Idle}, M - M_{min}) \quad \text{Eq. (1)}$$

And using R1=25% and R2=75%, Eq. (1) becomes:

$$M_T = M - \min\left(\frac{M}{4}, \frac{3M_{Idle}}{4}, M - M_{min}\right) \quad \text{Eq. (2)}$$

Ramp-down parameters R1 and R2 help ensure that the performance impact of reclaiming cache memory is minimal, because reclamation occurs in controlled steps over time, rather than in a single step of uncontrolled size.

Additionally, users can configure cache reclamation by changing the value of k, which governs when an object is considered idle. Increasing the value of k, increases the amount of data that is retained in caches, and generally improves performance; whereas reducing the value of k reduces the cost, but may incur a greater performance penalty.

For the example shown in plot 400, a serverless database's memory usage is 100 units and consists only of cache memory, and R1 and R2 are set at 25% and 75%, respectively. $M_{min}$ is 10 units, and all of the memory is idle. Eq. (2) becomes:

$$M_T = 100 - \min(25, 75, 90) = 100 - 25 = 75 \quad \text{Eq. (3)}$$

And the next iteration gives:

$$M_T = 75 - \min(18.75, 56.25, 65) = 75 - 18.75 \approx 56 \quad \text{Eq. (4)}$$

Thus, in each subsequent iteration, the memory reduces as follows: 100, 75, 56, 42, 32, 24, 18, 13, 10, 10, 10. This is shown in FIG. 4, as ramp-down profile 402 hits each of the values 100, 75, 56, 42, 32, 24, 18, 13, 10, 10, 10 and stays at 10 until the workload picks up or the serverless database is paused. See FIG. 2, noting that minimum 204 corresponds to 10, in this example.

A secondary control for the policy, configurable by the user in some examples, is t. Cache memory reclamation can be made more aggressive by using a smaller value of t, or the reverse of making the value of t larger can reduce reclamation. In the above example, with t set to 15 minutes, the 8 intervals required to reach the minimum memory, $M_{min}$, spans 120 minutes, whereas with t set to 15 minutes, $M_{min}$, is reached in only 40 minutes. Some users may take monetary considerations into account when tuning parameter values. In some examples, a utilization threshold is another parameter that influences price and performance outcomes and is tunable by users. By monitoring performance characteristics, such as throughput and latency (and others), a user may ascertain whether memory reclamation is too aggressive. Conversely, by monitoring costs, a user may ascertain whether memory reclamation is not aggressive enough to control costs. In either case, the user may change the value of any of k, active cache utilization threshold, t, R1, and R2 to determine whether price and performance characteristics are more acceptable. In some examples, ML component 136 collects parameters k, t, R1, and R2, and performance characteristics (such as throughput, latency, and others) into historical data 138. Performance characteristic differences before and after memory reclamation can thus be correlated with the various parameters. ML component 136 uses historical data 138 to tune any of k, t, R1, R2, and an active cache utilization threshold for a preferable ramp-down profile while minimizing performance impacts.

When the new memory target is set for the reclamation iteration, the specific cache entries to evict may be based on the cache entries that incur the lowest recourse cost to rehydrate back into the cache. This is the default eviction policy in some examples. Examples of cache rehydration resource costs include I/O to fetch data pages from disk and bring data back into the buffer pool or CPU overhead to regenerate query plans. Alternatively, in some examples, the policy may be configured to evict cache entries that were accessed longest ago. In some examples, the eviction policy may be based on a combination of cache rehydration resource costs and the amount of elapsed time since the cache entry was last accessed. In the case of the buffer pool, the difference between these policies might not be significant, but in the case of other caches such as query plan cache 146, the difference in customer performance impact between these policies can be significant.

In addition to caches, some examples also use query-specific working memory, such as memory grants for operations such as sorting and hashing. Some examples do reclaim working memory that is currently being used by a query. Instead, working memory is released once the query completes execution and is returned to the free list or buffer pool—after which it can be reclaimed as described herein. In some examples, the memory is released from the query perspective, but not from the server perspective. In such examples, the memory released as free memory or released to the buffer pool is the memory that is stolen from the buffer pool. Either way, the memory is reclaimed via free memory or buffer pool.

In some examples, the ramp-down step sizes can be increased by setting new lower memory targets (e.g., R1, and R2 increased) and the cooldown time period, t, between reclamation iterations can be shortened if telemetry from historical usage patterns is used to predict future usage patterns. For example, for a particular serverless database, the active cache utilization continues to remain low after several reclamation iterations until some minimum memory target is reached before workload activity returns. This pattern repeats itself each time workload activity returns and quiesces. If the prediction confidence is sufficiently high, based on the historical usage pattern, a new lower memory target $M_T$ can be set immediately to the minimum memory target. This reduces costs more quickly and, if the prediction is correct, will not impact performance.

FIG. 5 shows a graphical depiction of an implementation of a reclamation policy used during memory management process 300 (of FIG. 3). A memory usage profile 500a exists prior to a memory reclamation cycle that results in a memory usage profile 500b. Memory usage profile 500a indicates memory units 502-508 and 512-518 with their respective page weights. In some examples, page weights are based at least on cost (e.g., expense) to rehydrate into memory, and are determined (e.g., calculated) by cost calculator (e.g., see FIG. 1). Memory units 502-508 are indicated as "hot pages" (hot cache entries, e.g., any of buffer pool pages, query plans, column store segments, etc.) because they had been accessed less than some threshold 510 time ago, for example less than k. Memory units 512-518 are indicated as "cold pages" because they had not been accessed within threshold 510 time ago.

As indicated, hot memory unit 506 has a relatively low page weight, below a cache reclaim threshold 511, as do cold memory units 514 and 518. In some examples, thresholds 510 and 511 are stored within thresholds 116 (e.g., see FIG. 1); in some examples, threshold 510 and/or threshold 511 are customizable by a user; in some examples, threshold 510 and/or threshold 511 are tunable by ML component 136. In some examples, threshold 511 is different for hot pages than for cold pages, such as higher for hot pages, so that identifying memory to be reclaimed is weighted toward reclaiming cold pages. In some examples, eviction may be based at least on how long has elapsed since a memory until was last accessed or last read. In some examples, the policy may favor evicting cache entries that are most costly (e.g., incur the greatest performance overhead and latency) to regenerate in the cache.

In this example, memory units 506, 514, and 518 are identified as memory to be reclaimed. Thus, after memory reclamation, memory units 506, 514, and 518 are absent from memory usage profile 500b, indicating less memory after reclamation. The operation is illustrated by a memory status timeline 520. An initial status 522 has an allocation 524 of hot pages that includes memory units 502-508 and an allocation 526 of cold pages that includes memory units 512-518, and which corresponds to memory usage profile 500a. A shrink cache operation 530, corresponding to reclaiming phase 308 of memory management process 300 (of FIG. 3), reduces cache memory usage. A new status 532 has an allocation 534 of hot pages that includes only memory units 502, 504, and 508 and an allocation 536 of cold pages that includes only memory units 512 and 516, and which corresponds to memory usage profile 500b.

In some examples, on a schedule (e.g., a cache reclaim interval), the size of active cache entries (e.g., hot pages) across caches, is calculated. An active cache ratio is calculated as the ratio of the size of active cache entries to the total cache size. A new (e.g., lower) target cache size is determined based on the active cache utilization. This allows reclamation of cache entries (e.g., buffer pool pages, plan cache entries, etc.) by using existing heuristics based on lowest weighted pages. After a memory reclamation cycle, a cooldown period, t, elapses before another reclamation cycle. In some examples, during an idle period, all caches are flushed if certain utilization measures like CPU usage by user queries is zero for a sufficiently long time period. Thus, FIG. 5 illustrates a judicious trade-off between cost and performance, which is configurable and/or customizable so that users may achieve a desired cost-performance trade-off for their workloads.

An example billing calculation is provided. For a given time interval, user's cost, $C_{Total}$, is found by:

$$C_{billing\ interval} = \\ (vCore\ \text{unit price})(T_{billing\ interval})(\#\ vCores\ \text{used}) + \\ (\text{memory unit price})(T_{billing\ interval})(\text{memory used}) \quad \text{Eq. (5)}$$

$$C_{Total} = \sum_{all\ billing\ intervals} C_{billing\ interval} \quad \text{Eq. (6)}$$

where $T_{billing\ interval}$ is the time granularity for calculating user costs, and $C_{Total}$ is the total user costs for a billing period that includes all of the billing intervals. In some examples, the billing interval ($T_{billing\ interval}$) is one second; in some examples, it is ten seconds; in some examples, it is 100 milliseconds or another time duration. The vCore and memory unit prices may be set or variable, such as based on time of day or data center region, and may be expressed as monetary costs per unit resource per unit of time (e.g., dollars per GB memory per second, or dollars per vCore per second). Other billing calculations are used in some examples.

Figure 6:
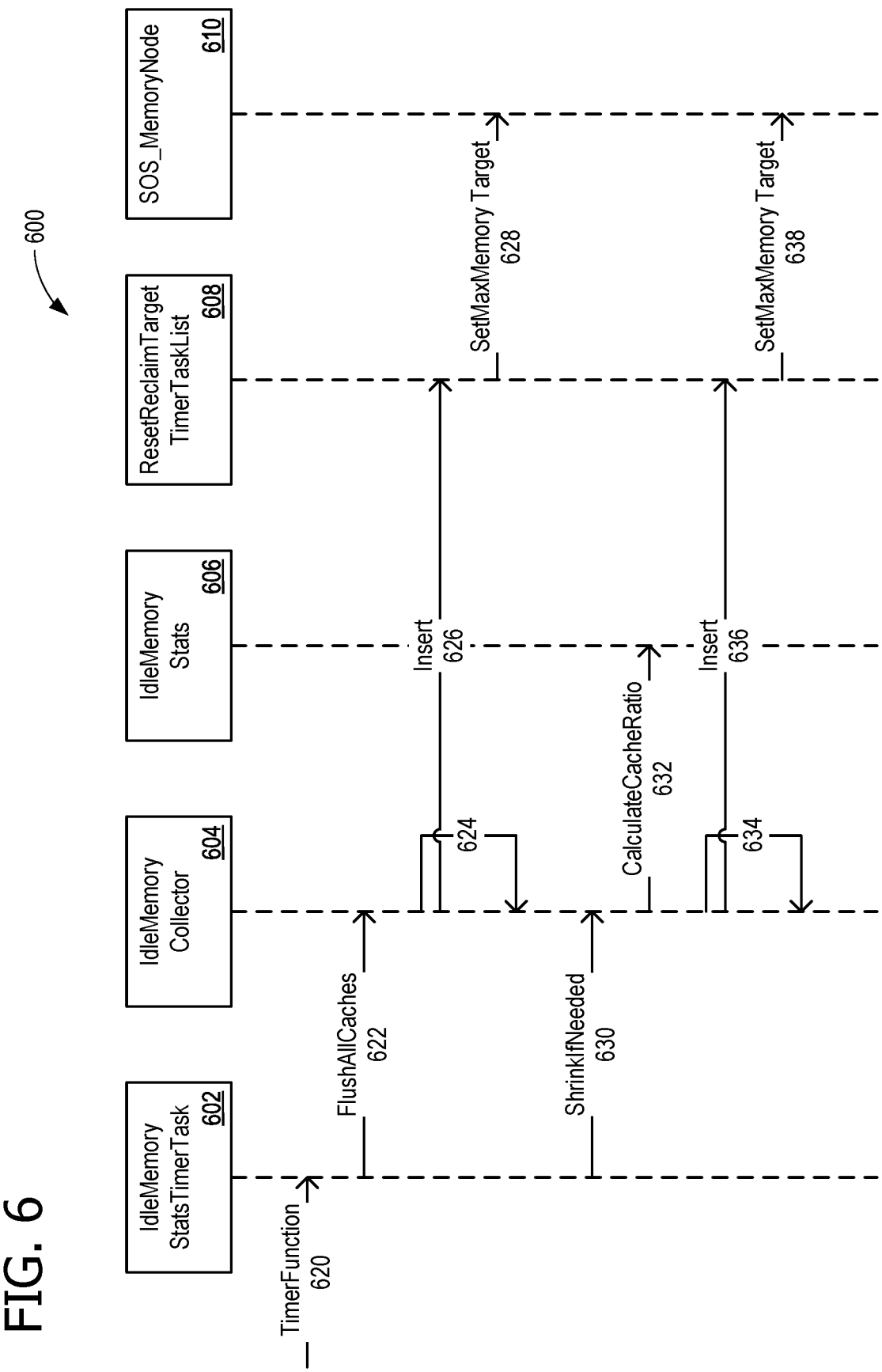
FIG. 6 illustrates an exemplary timeline of messages in the environment of FIG. 1.

FIG. 6 illustrates an exemplary timeline 600 of messages in environment 100 (of FIG. 1). Timeline 600 begins upon an IdleMemoryStatsTimerTask 602 receiving a TimerFunction message 620. IdleMemoryStatsTimerTask 602 sends a FlushAllCaches message 622 to an IdleMemoryCollector 604. IdleMemoryCollector 604 performs a SetReclaimTarget process 624 and sends an Insert message 626 to a ResetReclaimTargetTimerTaskList 608. ResetReclaimTargetTimerTaskList 608 sends a SetMaxMemory Target message 628 to an SOS_MemoryNode 610.

Upon IdleMemoryStatsTimerTask 602 sending a ShrinkIfNeeded message 630 to IdleMemoryCollector 604, IdleMemoryCollector 604 sends a CalculateCacheRatio message 632 to an IdleMemoryStats 606. IdleMemoryCollector 604 also performs a SetReclaimTarget process 634 and sends an Insert message 636 to ResetReclaimTargetTimerTaskList 608. ResetReclaimTargetTimerTaskList 608 sends a SetMaxMemory Target message 638 to SOS_MemoryNode 610.

Table 1 illustrates an example data structure, used by some examples.

TABLE 1

| Example Data Structure | | | |
|---|---|---|---|
| Name | Description | Units | Default |
| ServerlessActiveCacheThresholdMinutes | The active cache threshold is the amount of elapsed time since cache entry last used. This value informs the size of the active cache. Higher values generally result in more cache entry retention and may improve performance, but increases cost. | Minutes | 30 |
| ServerlessActiveCacheUtilization | The active cache utilization is the ratio of the size of active cache entries to the size of all cache entries. | Percentage | N/A |
| ServerlessCacheReclaimThreshold | If the active cache utilization is less than the cache reclaim | Percentage | 30 |

TABLE 1-continued

Example Data Structure

| Name | Description | Units | Default |
|---|---|---|---|
| | threshold, then the target cache size is reduced. Lower values generally result in more cache entry retention and may improve performance, but increases cost. | | |
| ServerlessCacheReclaimIntervalMinutes | The cache reclaim interval is the frequency of evaluating the active cache utilization for reducing the target cache size. | Minutes | 15 |
| ServerlessCacheReclaimCooldownPeriod Minutes | The cache reclaim cooldown period is the minimum period of time that must elapse since the last time cache was reclaimed before reclaiming can occur again. | Minutes | 30 |
| ServerlessTimeoutToResetReclaimTarget | The timeout to reset reclaim target is the elapsed time after initiating reclaim before the reclaim target is reset to max memory limit based on vCore max. | Seconds | 30 |

Some examples use SqlIdleMemoryStatsTimerTask::TimerFunction( ) as a timer function on intervals of ServerlessCacheReclaimIntervalMin minutes. An attempt is made at these intervals to shrink the cache memory I accordance with the disclosure herein. Upon intervals, of ServerlessCheckFlushCachesTimePeriodMinutes minutes, an attempt is made to flush all caches, if applicable.

Step-down sizes is a list of step down memory limits used to determine an amount of memory to reclaim (e.g., an amount by which to shrink memory). In some examples, the list is calculated as follows:
1. Upon initialization, call SOS_MemoryNode::GetCommilttedPotentialPages( ) to obtain the maximum memory limit. Add it to the list. Set CurrentStepDownSize to be the maximum memory limit.
2. Loop, if CurrentStepDownSize is not yet 0{
    Set CurrentStepDownSize=CurrentStepDownSize/ServerlessMemStepDownPercent, where ServerlessMemStepDownPercent is a configured value and its default is 50%. Add CurrentStepDownSize to the list.
}

SqlIdleMemoryStats evaluates caches memory activeness ratio and collects cost model histograms for the buffer pool and large caches. In this class, a function, SqlIdleMemoryStats::CalculateCacheActivePageRatio( ), is introduced to calculate cache memory activeness ratios. A cache entry is active if the amount of elapsed time since the cache entry last used is less than ServerlessActiveCacheThresholdMin. An example algorithm is provided:
1. Count the number of active data pages, for example, 500 pages. Calculate the buffer pool activeness ratio as the number of active data pages divided by the number of data pages sampled.
2. Let TotalPages be the total number of cache entry pages. Initialize the TotalPages to the number of total buffer pool pages.
3. Let ActivePages be the number of active cache entry pages. Initialize the ActivePages to the number of total buffer pool pages multiplied by the buffer pool activeness ratio.
4. Iterate through the cache stores to obtain the total number of cache store entry pages and the number of active cache entry pages. Update TotalPages and ActivePages.
5. Iterate through the user stores to obtain the total number of user store entry pages and the number of active entry pages. Update TotalPages and ActivePages.
6. Iterate through the large cache stores to obtain the total number of large cache store entry pages and the number of active entry pages. Update TotalPages and ActivePages.
7. The cache active ratio may then be calculated as ActivePages divided by TotalPages.

SqlIdleMemoryCollector is the cache memory manager to collect idle cache memory. It calls SqlIdleMemoryStats::CalculateCacheActivePageRatio( ) to evaluate the cache active ratio. If the cache active ratio is less than ServerlessCacheReclaimThreshold, it obtains a step-down size from the list of step-down sizes such that the total number of cache pages is greater than the step-down size multiplied by (1+ServerlessMemStepDownSizeExtraBufPercent), where ServerlessMemStepDownSizeExtraBufPercent is used to prevent a ping-pong scenario. The reclaim pages is set to be the total cache pages minus step-down sizes.

SqlIdleMemoryCollector::SetReclaimTarget( ) is called to set the reclaim target to shrink cache memory. In some examples, the shrink policy is set to a value defined by SoftMaxTarget. The first attempt is to shrink external caches, and then internal caches are attempted next, in some examples. With this scheme, the plan/object caches are generally the last to be shrunk.

In the case of an absence of user activity for more than 30 minutes (or some other threshold), SqlIdleMemoryCollector::FlushAllCachesIfNeededForServerless( ) is called. This function checks the duration of user inactivity duration and flushes all caches by calling DbccFreeSystemCacheLocal( ). The SqlIdleMemoryCollector::SetReclaimTarget( ) is called to shrink the memory down to the minimum memory defined for the serverless instance.

ResetReclaimTargetTimerTaskList is a list of tasks identified as ResetReclaimTargetTimerTask, and prevents race conditions between multi-instance memory brokerage and memory management for a serverless instance. An example algorithm for the ResetReclaimTargetTimerTaskList is provided:
1. When a ResetReclaimTargetTimerTask is inserted into the list, obtain either the minimum SoftMaxTarget or the minimum DirectShrinkTarget, based on the shrink policy associated with the timer task. Either set the new SoftMaxTarget or the new DirectShrinkTarget based on the shrink policy.

2. Upon calling ResetReclaimTargetTimerTaskList::CheckTimeoutForTimerTasks( ), enumerate through the timer tasks in the list. If a task has timed out, remove the task and update or reset either SoftMaxTarget or DirectShrinkTarget, based on the shrink policy of the removed task.

Figure 7:
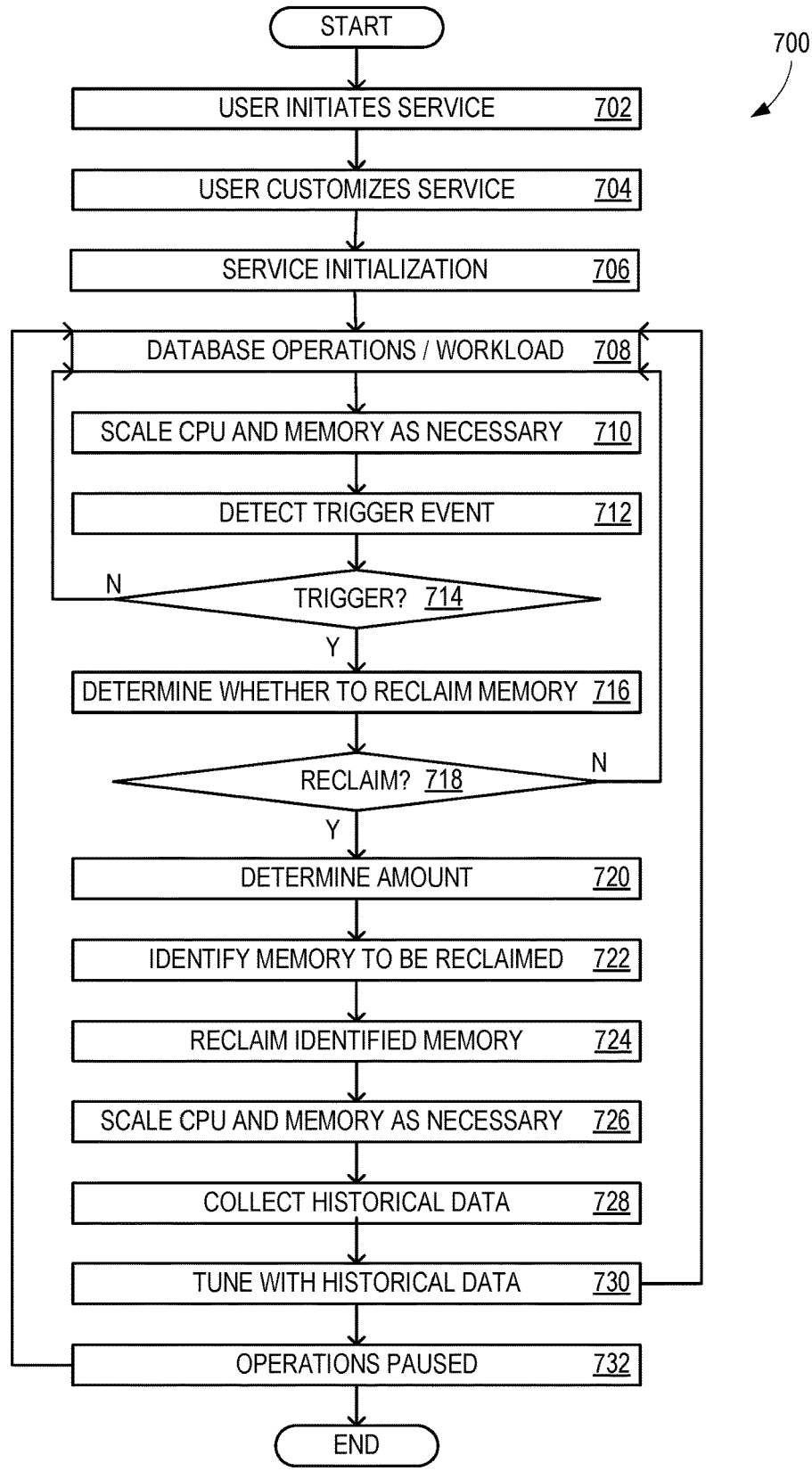
FIG. 7 is a flow chart illustrating exemplary operations involved in memory management for serverless databases.

In some examples, telemetries are handled by a Kusto table MonSqlIdleMemCollectorStats that is used to track idle memory collector related events, such as:
 collect_cost_model_histograms
 set_reclaim_target
 init_step_down_sizes
 shrink_if_needed
 cache_activeness_stats
 enqueue_flush_all_caches_task
 flush_all_caches
 set_target_task_list_lock_failure
 operate_set_target_task_list
 store_cache_stats_collection_stats
 store_cache_stats_histogram FIG. 7 is a flow chart 700 illustrating exemplary operations involved in memory management for serverless databases. In some examples, operations described for flow chart 700 are performed by computing device 900 of FIG. 9. Flow chart 700 commences with operation 702, in which a user initiates a serverless database service with a service provider, such as a cloud-based provider. In some examples, the serverless database is a serverless SQL database. In operation 704, the user customizes the service parameters, such as setting criteria for a memory reclamation trigger, selecting (e.g., defining) performance parameters to measure for determining whether memory is to be reclaimed, selecting (e.g., defining) one or more ramp-down parameters (e.g., time interval and step size), selecting (e.g., defining) memory reclamation policies, and/or other customizeable parameters that can balance the cost/performance trade-off according to the user's preferences.

In some examples, the trigger event is a timer event, a memory usage parameter exceeding a threshold, and/or another user-defined custom trigger condition that will be used in operation 712. In some examples, operation 704 includes receiving a selection defining at least a portion of a set of performance parameters to measure for determining whether memory is to be reclaimed, that will be used in operation 716. In some examples, operation 704 includes receiving a selection defining the ramp-down parameter that will be used in operation 730. In some examples, operation 704 includes receiving a selection defining a memory reclamation policy that will be used in operation 722 and/or 724.

The serverless database service is initialized in operation 706, for example by setting CPU and memory boundaries (e.g., CPU maximum cap and memory minimum) and beginning execution of a database engine instance execution for the user. The user employs the serverless database service in operation 708, for example to process data. The service provider scales resources as needed, for example, increasing or decreasing CPU utilization and growing the memory cache according to the user's workload, in operation 710. In some examples, the service provider scales CPU resources independently of scaling cache memory resources.

Operation 712 includes detecting a trigger event for reclaiming memory from a serverless database instance. In some examples, the trigger event includes one or more of: a timer event, a memory usage parameter exceeding a threshold, and another user-defined custom trigger condition (e.g., see operation 712). In some examples, a reclamation trigger condition is evaluated against an aggregation of cache entries across multiple database instances in a pool of databases. If, in decision operation 714, a trigger event is detected, operation 716 includes, based at least on detecting the trigger event, determining whether memory is to be reclaimed. In some examples, determining whether memory is to be reclaimed comprises measuring the set of performance parameters. If, in decision operation 714, a trigger event is not detected, or in decision operation 718, no memory is to be reclaimed, flow chart 700 returns to operation 708 for ongoing serverless database operations.

Otherwise, operation 720 includes, based at least on determining that memory is to be reclaimed, determining an amount of memory to be reclaimed. In some examples, determining an amount of memory to be reclaimed comprises calculating the amount of memory to be reclaimed using a ramp-down parameter (e.g., see operation 712). Operation 722 includes identifying memory to be reclaimed. In some examples, identifying memory to be reclaimed comprises identifying a memory eviction priority. In some examples, the memory eviction priority is based at least on a cost to rehydrate a cache entry. In some examples, the memory eviction priority is based at least on the length of time that has elapsed since the cache entry had last been accessed. In some examples, a combination is used (e.g., see operation 712). In some examples, identifying memory to be reclaimed comprises identifying cache entries to evict across caches entries for the multiple database instances in the pool of databases. Operation 724 includes reclaiming the identified memory. In some examples, reclaiming the identified memory comprises reclaiming the identified memory according to a reclamation policy (e.g., see operation 712).

The service provider continues to scale resources as needed, for example, increasing or decreasing CPU utilization and growing or shrinking the memory cache according to the user's workload and the reclamation process described herein, in operation 726. In some examples, the service provider scales CPU resources independently of scaling cache memory resources. Historical data is collected in operation 728, to use for tuning the memory reclamation parameters, for example with an ML component or another approach. Operation 730 includes tuning the ramp-down parameter based at least on the historical data. In some examples, operation 730 uses an ML component for the tuning. In some examples, operation 730 involves tuning other or additional aspects of memory management for serverless databases. Flow chart 700 then returns to operation 708 for ongoing serverless database operations or is paused in operation 732 (e.g., by the user) and resumes with operation 708 at a later time.

Figure 8:
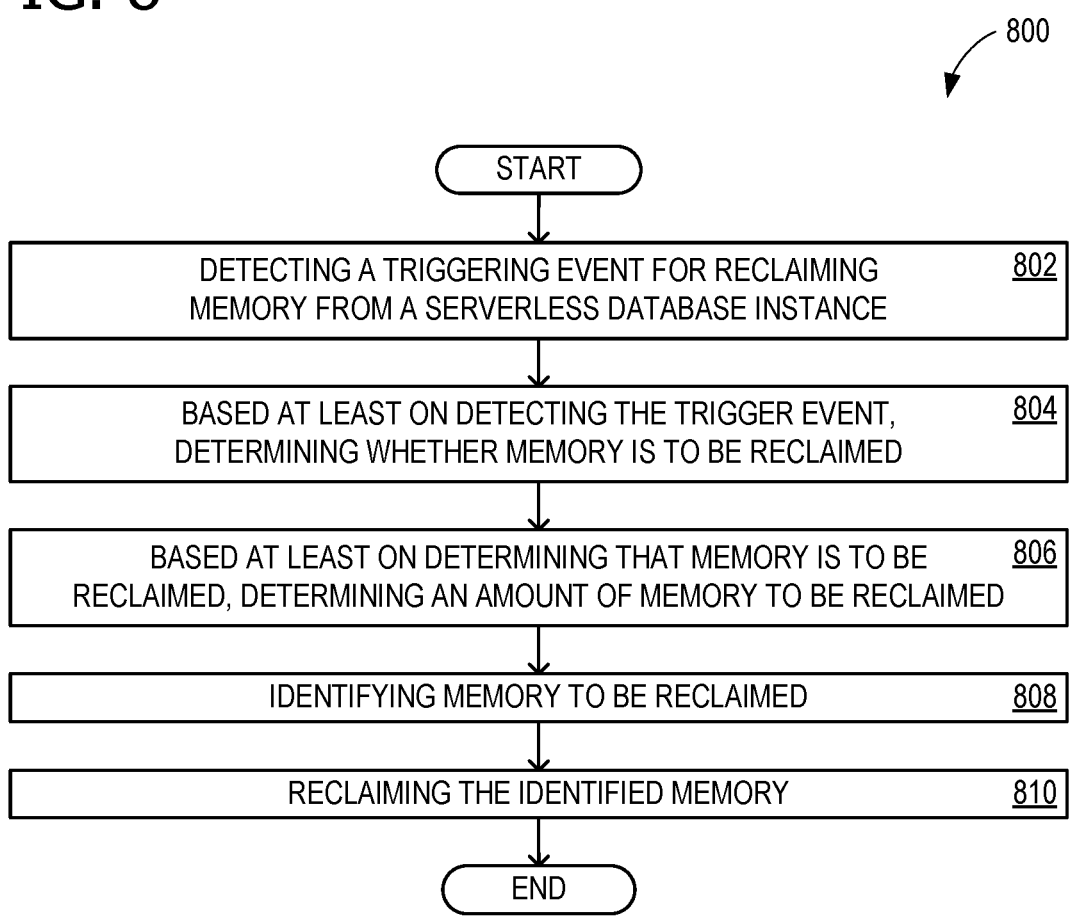
FIG. 8 is another flow chart illustrating exemplary operations involved in memory management for serverless databases.

FIG. 8 is a flow chart 800 illustrating exemplary operations involved in memory management for serverless databases. In some examples, operations described for flow chart 800 are performed by computing device 900 of FIG. 9. Flow chart 800 commences with operation 802, which includes detecting a trigger event for reclaiming memory from a serverless database instance. In some examples, the trigger event comprises at least one event selected from the list consisting of a timer event and a memory usage parameter exceeding a threshold. Operation 804 includes, based at least on detecting the trigger event, determining whether memory is to be reclaimed. In some examples, determining whether memory is to be reclaimed comprises measuring the set of performance parameters.

Operation 806 includes, based at least on determining that memory is to be reclaimed, determining an amount of memory to be reclaimed. In some examples, determining an amount of memory to be reclaimed comprises calculating the amount of memory to be reclaimed using a ramp-down parameter. Operation 808 includes identifying memory to be reclaimed. In some examples, identifying memory to be reclaimed comprises identifying a memory eviction priority. In some examples, the memory eviction priority is based at least on a cost to rehydrate a cache entry. Operation 810 includes reclaiming the identified memory. In some examples, reclaiming the identified memory comprises reclaiming the identified memory according to a reclamation policy.

Additional Examples

Some aspects and examples disclosed herein are directed to a system for memory management of serverless databases comprising: a processor; and a computer-readable medium storing instructions that are operative upon execution by the processor to: detect a trigger event for reclaiming memory from a serverless database instance; based at least on detecting the trigger event, determine whether memory is to be reclaimed; based at least on determining that memory is to be reclaimed; determine an amount of memory to be reclaimed; identify memory to be reclaimed; and reclaim the identified memory.

Additional aspects and examples disclosed herein are directed to a method of memory management for serverless databases comprising: detecting a trigger event for reclaiming memory from a serverless database instance; based at least on detecting the trigger event, determining whether memory is to be reclaimed; based at least on determining that memory is to be reclaimed, determining an amount of memory to be reclaimed; identifying memory to be reclaimed; and reclaiming the identified memory.

Additional aspects and examples disclosed herein are directed to one or more computer storage devices having computer-executable instructions stored thereon for memory management of serverless databases, which, on execution by a computer, cause the computer to perform operations comprising: detecting a trigger event for reclaiming memory from a serverless database instance, wherein the trigger event comprises at least one event selected from the list consisting of: a timer event and a memory usage parameter exceeding a threshold; receiving a selection defining at least a portion of a set of performance parameters; based at least on detecting the trigger event, determining whether memory is to be reclaimed, wherein determining whether memory is to be reclaimed comprises measuring the set of performance parameters; receiving a selection defining a ramp-down parameter; based at least on determining that memory is to be reclaimed, determining an amount of memory to be reclaimed, wherein determining an amount of memory to be reclaimed comprises calculating amount of memory to be reclaimed using the ramp-down parameter; identifying memory to be reclaimed, wherein identifying memory to be reclaimed comprises identifying a memory eviction priority; receiving a selection defining a memory reclamation policy; and reclaiming the identified memory according to the memory reclamation policy.

Alternatively, or in addition to the other examples described herein, examples include any combination of the following:

the trigger event comprises a timer event;
the trigger event comprises a memory usage parameter exceeding a threshold;
determining whether memory is to be reclaimed comprises measuring a set of defined performance parameters;
receiving a selection defining at least a portion of the performance parameters;
determining an amount of memory to be reclaimed comprises calculating the amount of memory to be reclaimed using a ramp-down parameter;
receiving a selection defining the ramp-down parameter;
tuning the ramp-down parameter based at least on historical data;
identifying memory to be reclaimed comprises identifying a memory eviction priority;
receiving a selection defining a memory reclamation policy;
the memory eviction priority is based at least on a cost to rehydrate a cache entry;
evaluating a reclamation trigger condition against an aggregation of cache entries across multiple database instances in a pool of databases;
identifying memory to be reclaimed comprises identifying cache entries to evict across caches entries for the multiple database instances in the pool of databases;
reclaiming the identified memory comprises reclaiming the identified memory according to the reclamation policy; and
scaling CPU resources independently of scaling cache memory resources.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
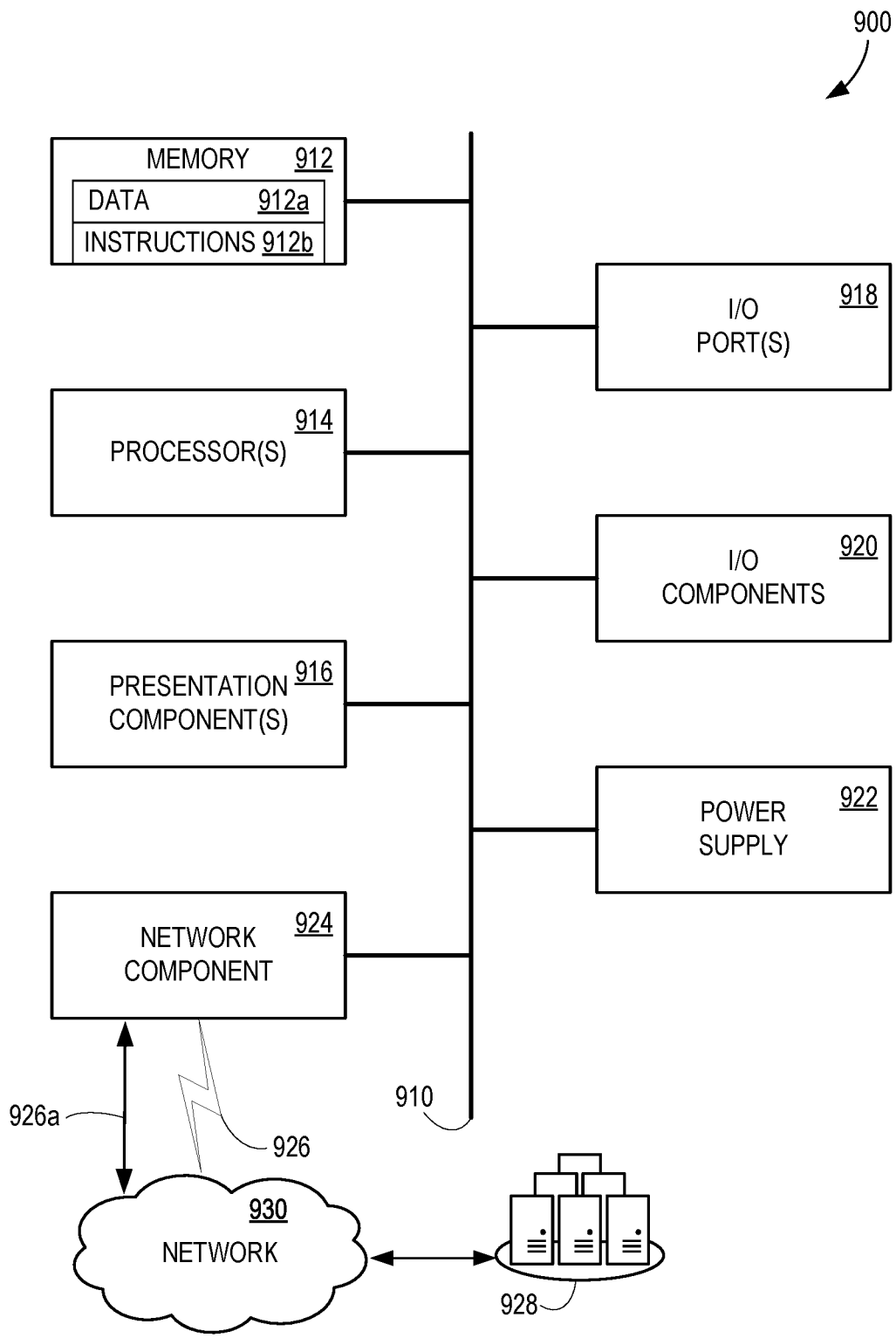
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912*a* and instructions 912*b* that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926*a* to a cloud resource 928 across network 930. Various different examples of communication links 926 and 926*a* include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. One or more computer storage devices having computer-executable instructions stored thereon for memory management of serverless databases, which, on execution by a computer, cause the computer to perform operations comprising:
    detecting a trigger event for reclaiming memory from a serverless database instance, wherein the trigger event comprises at least one event selected from the list consisting of;
    a timer event and a memory usage parameter exceeding a threshold;
    receiving a selection defining at least a portion of a set of performance parameters;
    based at least on detecting the trigger event, determining whether memory is to be reclaimed, wherein determining whether memory is to be reclaimed comprises measuring the set of performance parameters;
    receiving a selection defining a ramp-down parameter;
    based at least on determining that memory is to be reclaimed, determining an amount of memory to be reclaimed, wherein determining an amount of memory to be reclaimed comprises calculating the amount of memory to be reclaimed using the ramp-down parameter;
    identifying memory to be reclaimed, wherein identifying memory to be reclaimed comprises identifying a memory eviction priority;
    receiving a selection defining a memory reclamation policy; and
    reclaiming the identified memory according to the memory reclamation policy.

2. The one or more computer storage devices of claim 1, wherein the memory eviction priority is based at least on a cost to rehydrate a cache entry.

3. A system for memory management of serverless databases, the system comprising:
    a processor; and
    a computer-readable medium storing instructions that are operative upon execution by the processor to:
        detect a trigger event for reclaiming memory from a serverless database instance, the triggering event being an active cache utilization ratio is below a predefined threshold, the active cache utilization ratio being a fraction of pages that had been accessed during a prior time period;
        based at least on detecting the trigger event, determine a memory for caches is to be set to a particular size; and
        setting the memory to the particular size.

4. The system of claim 3, wherein the trigger event comprises at least one event selected from the list consisting of;
    a timer event and a memory usage parameter exceeding a threshold.

5. The system of claim 3, wherein the instructions are further operative to:
    receive a selection defining at least a portion of a set of performance parameters, wherein determining whether memory is to be reclaimed comprises measuring the set of performance parameters.

6. The system of claim 3, wherein determining an amount of memory to be reclaimed comprises calculating the amount of memory to be reclaimed using a ramp-down parameter.

7. The system of claim 6, wherein the instructions are further operative to:
receive a selection defining the ramp-down parameter.

8. The system of claim 6, wherein the instructions are further operative to:
tune the ramp-down parameter based at least on historical data.

9. The system of claim 3, wherein the particular size is based on how far the active cache utilization ratio is below the predefined threshold.

10. The system of claim 3, wherein the instructions are further operative to:
receive a selection defining a memory reclamation policy; and
wherein reclaiming the identified memory comprises reclaiming the identified memory according to the reclamation policy.

11. The system of claim 3, wherein the instructions are further operative to:
evaluate a reclamation trigger condition against an aggregation of cache entries across multiple database instances in a pool of databases; and
wherein identifying memory to be reclaimed comprises identifying cache entries to evict across caches entries for the multiple database instances in the pool of databases.

12. A method of memory management for serverless databases, the method comprising:
detecting a trigger event for reclaiming memory from a serverless database instance, the triggering event being an active cache utilization ratio is below a predefined threshold, the active cache utilization ratio being a fraction of pages that had been accessed during a prior time period;
based at least on detecting the trigger event, determining a memory for caches is to be set to a particular size; and
setting the memory to the particular size.

13. The method of claim 12, wherein the active cache utilization ratio is a fraction of pages that had been accessed during a prior interval.

14. The method of claim 12, further comprising:
receiving a selection defining at least a portion of a set of performance parameters, wherein determining whether memory is to be reclaimed comprises measuring the set of performance parameters.

15. The method of claim 12, wherein determining an amount of memory to be reclaimed comprises calculating the amount of memory to be reclaimed using a ramp-down parameter.

16. The method of claim 15, further comprising:
receiving a selection defining the ramp-down parameter.

17. The method of claim 15, further comprising:
tuning the ramp-down parameter based at least on historical data.

18. The method of claim 12, wherein identifying memory to be reclaimed comprises identifying a memory eviction priority, and wherein the memory eviction priority is based at least on a cost to rehydrate a cache entry.

19. The method of claim 12, further comprising:
receiving a selection defining a memory reclamation policy; and
wherein reclaiming the identified memory comprises reclaiming the identified memory according to the reclamation policy.

20. The method of claim 12, further comprising:
evaluating a reclamation trigger condition against an aggregation of cache entries across multiple database instances in a pool of databases; and
wherein identifying memory to be reclaimed comprises identifying cache entries to evict across caches entries for the multiple database instances in the pool of databases.

* * * * *